Patented Sept. 2, 1924.

1,507,521

UNITED STATES PATENT OFFICE.

MATTHEW RUSSELL, OF GREENOCK, SCOTLAND.

PROCESS FOR REVIVIFYING FILTERS.

No Drawing.   Application filed December 8, 1923.   Serial No. 679,473.

*To all whom it may concern:*

Be it known that MATTHEW RUSSELL, subject of the King of the United Kingdom of Great Britain and Ireland, residing at Greenock, in the county of Renfrewshire, Scotland, has invented certain new and useful Improvements in Processes for Revivifying Filters, of which the following is a specification.

This invention relates to the revivification of charcoal or other carbonaceous filtering medium in the filter chambers of sugar or other liquor refineries and relates more particularly to a process of the kind wherein the filtering medium is cleansed by the action of steam or steam and water, filtration of the liquor and washing and revivification of the filtering medium being carried out in the same filter chamber or containing vessel, thus obviating the necessity of emptying the filter chambers and conveying the filtering medium to kilns for revivification.

According to the present invention, the improved process for revivifying the charcoal or other carbonaceous filtering medium in the filter chamber comprises subjecting the filtering medium to superheated steam at a temperature above approximately 600° F., the superheated steam being passed through the filter chamber when the filtering medium has become spent or reached its limit of usefulness.

My improved process also comprises the further or additional step of cooling the filtering medium by passing saturated steam through the filter chamber.

For the purpose of carrying out my invention, the filtering chamber, which may consist of a cistern or containing vessel of cast iron, steel, or other suitable metal, is preferably lined with fire-brick or other non-conducting material and may be lagged outside, if desired. The filter chamber or containing vessel is fitted with the usual valves for liquor, water and air, but in addition thereto, valve-controlled pipes are fitted to admit highly superheated steam at a very low pressure and also saturated steam at low pressure in the case of existing filter vessels which are not suitable for pressures above ten pounds per square inch. In the case of filter vessels constructed specially for this process, the limit of pressure would depend only on the strength of the vessel.

One method of filtering according to the present invention would be as follows:—The liquor is run through the filtering chamber until such time as the filtering medium has reached its limit of usefulness, when the liquor supply is cut off and the liquor drained from the filtering chamber. The filtering medium is then washed and air may be introduced to dry it in known manner, after which superheated steam is introduced, preferably at a very low pressure and at a temperature of from 600° to 1000° F. The superheated steam completely revivifies the charcoal, which may be thereafter cooled by introducing low pressure saturated steam into the filtering chamber and, as the saturated steam is superheated before leaving the filtering chamber, it may be conveyed to the next filtering chambers or containing vessels for the purpose of partially heating up or revivifying the charcoal or other filtering medium contained therein.

The charcoal or other filtering medium gradually increases its percentage of carbon and impurities after continued use, and this percentage may be reduced or maintained at any desired figure by introducing the necessary quantity of air with the superheated steam, in order to decarbonize the filtering medium. Alternatively, the cooling and decarbonization of the filtering medium may be effected by introducing or blowing air through the filtering medium to burn off excess carbon.

In filtering apparatus using charcoal or other carbonaceous filtering medium for the decolorization of sugar liquors, a quantity of sugar is retained in the filtering medium before commencing washing and revivification thereof and this sugar is so diluted in the washing operation that it is uneconomical to evaporate these washings for the purpose of recovering the sugar. It is a further object of the present invention to enable the whole of the sugar so retained in the filtering medium to be recovered and for this purpose, immediately after the liquor supply has been cut off, saturated or superheated steam may be admitted with or without water, the admixture of water depending on the temperature of the filtering medium. The temperature of the combined water and steam supply should preferably be between 200 to 220° F. so as to ensure that the whole of the sugar is recovered in solution with the minimum amount of water and condensed steam.

The steam and water pressure adopted during the recovery of the sugar and the steam pressure adopted during the revivification of the filtering medium may vary up to the permissible working pressure allowable in the filtering vessel. The temperature of the filtrate and filtering medium is so arranged that caramelization, destruction of sugar or chemical change in the filtrate is avoided, by regulating the said temperature between the limits of 200 and 220° F.

A closely woven wire gauze or incombustible perforated screen is preferably fitted in the bottom of the filtering chamber to prevent any fine dust in the charcoal or other filtering medium from being discharged with the sugar liquor.

Claims:

1. A process of revivifying charcoal or other carbonaceous filtering medium in filter chambers for sugar and other liquors, which consists in passing superheated steam through one filter chamber at a temperature above approximately 600° F., thereafter cooling the filtering medium in said filter chamber by passing saturated steam therethrough, transferring the saturated steam as superheated steam to the next filter chamber for partially revivifying the filtering medium therein and thereafter repeating the process successively, substantially as described.

2. A process of revivifying and decarbonizing charcoal or other carbonaceous filtering medium in filter chambers for sugar and other liquors, which consists in passing superheated steam and air through the filter chamber at a temperature above approximately 600° F.

3. A process of revivifying and decarbonizing charcoal or other carbonaceous filtering medium in filter chambers for sugar and other liquors, which consists in passing superheated steam through the filter chamber at a temperature above approximately 600° F. and thereafter introducing the air to cool the filtering medium and to decarbonize the same.

4. A process of recovering sugar in solution and of revivifying charcoal or other carbonaceous filtering medium in filter chambers for sugar liquors, which consists in extracting the sugar from the filtering medium by passing through the filter chamber a mixture of steam and water, the combined temperature of steam and water being maintained at approximately 200° to 220° F., and thereafter passing superheated steam from the filter chamber at a temperature above approximately 600° F. for the purpose of revivifying the filtering medium.

The foregoing specification signed at Glasgow, Scotland, this fourteenth day of November, 1923.

MATTHEW RUSSELL.